United States Patent

Sealey

[11] 3,888,436
[45] June 10, 1975

[54] AIRPLANE LANDING GEAR SHOCK ABSORBER

[75] Inventor: Francis Sealey, Bellevue, Wash.

[73] Assignee: The Boeing Company, Seattle, Wash.

[22] Filed: Apr. 1, 1974

[21] Appl. No.: 457,003

[52] U.S. Cl............ 244/104 FP; 188/282; 188/284; 188/314; 267/64 R
[51] Int. Cl........................................... B64c 25/60
[58] Field of Search ................ 244/104 R, 104 FP; 267/64 R; 213/323; 188/314, 315, 284, 282, 317

[56] References Cited
UNITED STATES PATENTS
2,735,674   2/1956   Smith et al............. 244/104 FP UX
FOREIGN PATENTS OR APPLICATIONS
866,370   8/1941   France............................ 267/64 R Primary Examiner—Trygve M. Blix
Assistant Examiner—Paul E. Sauberer
Attorney, Agent, or Firm—B. A. Donahue; Glenn Orlob

[57] ABSTRACT

An aircraft landing gear shock absorbing strut of the telescopic pneumatic/hydraulic type having a two stage pneumatic spring, with one stage only functioning during the absorption of landing impact, and both stages functioning during taxiing. The strut includes improved means for controlling its damping characteristics such that its motion during the initial landing impact and subsequent rebound is heavily damped, but motion during taxi is damped to a lesser degree providing a more comfortable ride while taxiing.

8 Claims, 8 Drawing Figures

SHOCK ABSORBER EXTENDED

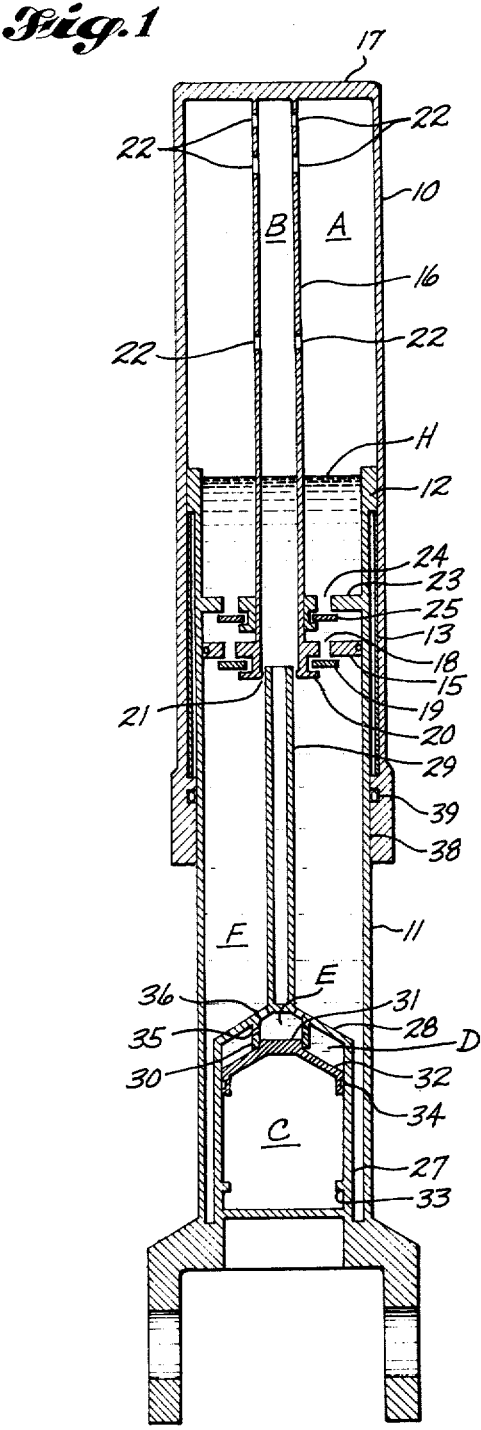
SHOCK ABSORBER EXTENDED
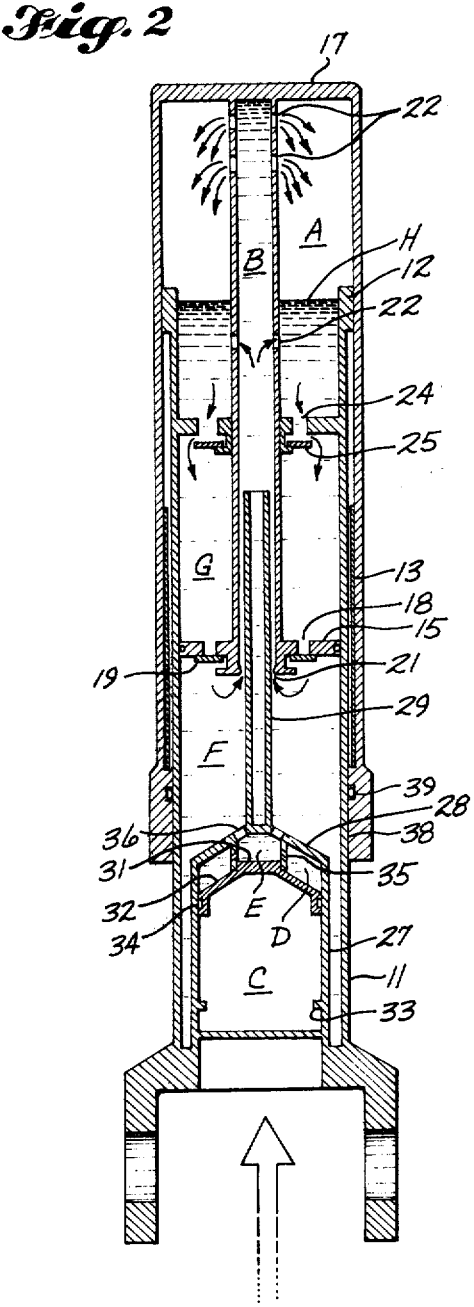
SHOCK ABSORBER BEING COMPRESSED

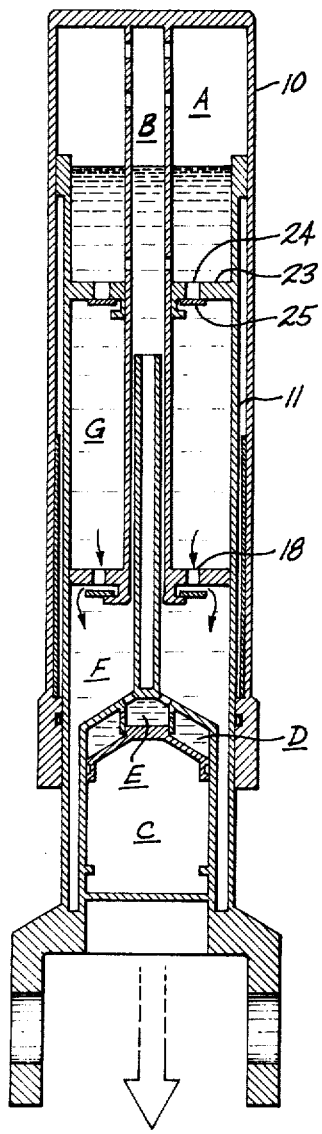
SHOCK ABSORBER EXTENDING
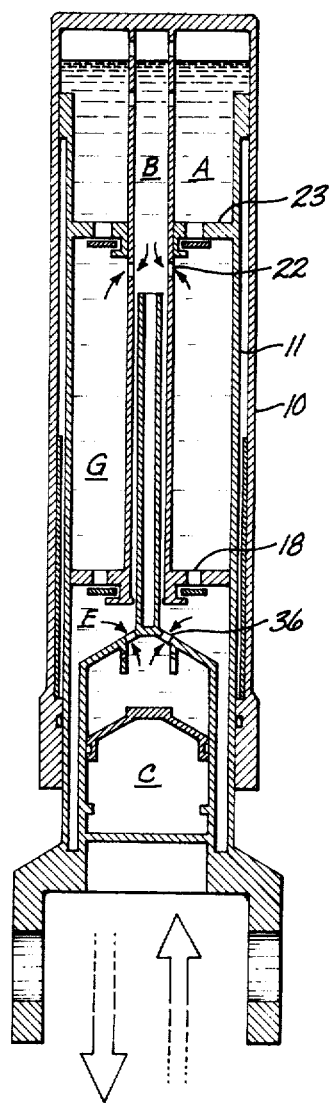
TAXI CONDITION 3,888,436

SHEET 3

TYPICAL LOAD-STROKE CURVE

3,888,436

AIRPLANE LANDING GEAR SHOCK ABSORBER

BACKGROUND OF THE INVENTION AND DESCRIPTION OF PRIOR ART

Aircraft landing gear perform two general functions which involve the "shock strut." The first is to reduce the forces experienced by the airplane and its occupants while the vertical velocity of the airplane is reduced from some discrete value to zero when the airplane "touches down" or alights. This function involves absorbing and dissipating the kinetic energy associated with the airplane's mass and vertical velocity. The energy is dissipated through viscous friction by forcing fluid in the strut through an orifice, and is stored in the compression of a volume of gas called "pneumatic spring."

The second function is to provide a suspension system for the airplane during its operation on the ground. The requirements of the system for an airplane taxiing are much like those for automobile and truck suspensions. It is desirable that the system provide a smooth ride for the occupants and assure as much as possible that the tires remain in contact with the ground at all times for safe steering and effective braking.

It is well known in the art that a strut designed to perform the energy absorbing function most efficiently in terms of size and weight of the strut will employ a high compression ratio pneumatic spring and strongly restrict the extension of the strut (i.e., slow release of the energy stored in the pneumatic spring). The high compression ratio feature permits a more compact strut design. Also, the gas pressure in the extended strut may be lower, which results in a more gentle and smooth initiation of the compression of the strut during touchdown. Unfortunately, these characteristics of an efficient, effective shock absorber are not suitable to an effective, efficient suspension system. When the strut is compressed by the weight of the airplane during taxiing, it has a short, stiff, highly damped stroke which provides a hard ride. The springiness of the strut is much less than that of the tires, so that the tires tend to bounce the airplane off the ground as bumps and unevenness are encountered. Further, the strong restriction of the extension of the strut tends to prevent it from extending to hold the wheels in contact with the ground as the main mass of the airplane follows the trajectory of a bounce. A strut designed for optimum performance of the suspension function should have a relatively large, low compression ratio pneumatic spring, with little extension restriction. With this kind of spring a larger portion of the landing impact energy will be stored in the spring rather than dissipated in the form of heat in the hydraulic fluid. This energy will tend to extend the struts and push the airplane off the ground, and the limited extension restriction desired in a strut designed for optimum suspension will do little to prevent such a "rebound" of the airplane. It is thus apparent that a strut which performs both functions well should incorporate features for adjusting or controlling the extension rate and the effective air spring compression ratio, and that these adjustments or controls must be appropriately interrelated.

SUMMARY OF THE INVENTION

A shock absorbing strut for aircraft landing gear using a two-stage spring, the operation of the second stage of which is controlled by hydraulic pressures and forces as well as the usual pneumatic pressures and forces. Means are provided for limiting the rate of extension of the strut after landing compression. Means are also provided to alter the damping characteristics of the strut during taxiing and while the second stage of the gas spring is functioning to give a smoother ride.

An object of this invention is to provide efficient absorption of the landing impact energy in terms of weight and size of the strut.

Another object is to effectively control the extension of the strut after landing compression.

Another object is to achieve the extension restriction with moderate hydraulic pressures.

Another object is to provide a soft spring when the strut is functioning as a suspension system during taxi.

Another object is to provide relatively less extension restriction during the suspension function, compared to that in effect during landing shock absorption extension, while still providing optimum fluid damping for the purposes of suspension.

BRIEF DESCRIPTION OF DRAWINGS

All the figures are schematic section views of a shock strut embodying the invention.

FIG. 1 illustrates the strut when fully extended.

FIG. 2 illustrates the same undergoing compression during a landing impact.

FIG. 3 illustrates the same at the instant of completion of the compression stroke.

FIG. 4 shows the same during extension following the landing compression stroke.

DESCRIPTION OF THE PREFERRED EMBODIMENT

Figure 5:
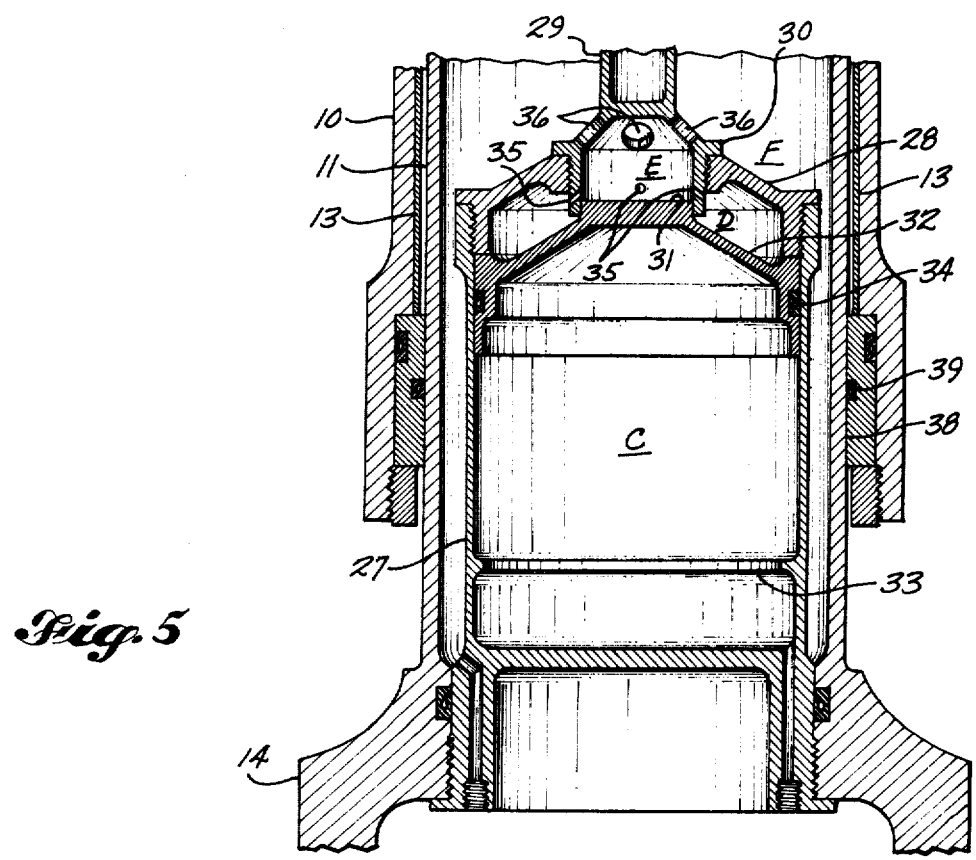
FIG. 5 illustrates the strut functioning as a pure suspension device during taxiing.

In the preferred embodiment of the invention illustrated in FIG. 1, outer cylinder 10 of the strut is attached to the structure of an aircraft and yoke 14, attached to the lower end of inner cylinder 11, serves as a connection to the landing gear axle. Inner cylinder 11 is restrained from further extension beyond the position shown by rim 12 and stop sleeve 13. Inner cylinder 11 slides into and out of outer cylinder 10 on bearing surface 38 and the outer surface of rim 12. Lower piston assembly 15 is attached to the lower end of tube 16 which in turn is attached to the head 17 of outer cylinder 10. Piston assembly 15 contains orifices 18 and includes valve ring 19, flange 20, and orifice lip 21. Chamber A, inside outer cylinder 10 and outside tube 16, is interconnected with Chamber B, located inside tube 16, by ports 22. Upper piston assembly 23 includes orifices 24, valve ring 25, and flange 26 and is attached to the walls of inner cylinder 11. It is similar in detail to piston assembly 15 and fits closely to the outer wall of tube 16. Cylinder 27 is centrally attached to the bottom end 14 of inner cylinder 11 and is fitted with a conical head 28 which supports metering pin 29. Bleed port cylinder 30, centrally located on the lower side of heat 28, mates slidably with boss 31 on a conically shaped free-floating piston 32 which slides inside cylinder 27. Downward motion of piston 32 is limited by stop ring 33. Chamber C, located beneath piston 32 within cylinder 27, is sealed from Chamber D above it by seal 34. Chambers E and D communicate by means of taxi bleed ports 35, and taxi ports 36 provide communication between Chambers E and F. Rebound Chamber G is located between upper piston assembly 23 and lower piston assembly 15 within inner cylinder 11. Chamber C is filled with gas at a pre-determined pressure. Chambers D, E, F and G are completely filled with a suitable hydraulic fluid. Chambers A and B are filled with fluid to level H and contain pressurized gas above level H. The fluid is prevented from leaking between inner cylinder 11 and bearing surface 38 by seal 39. The lower portion of the strut is shown in greater detail in FIG. 5.

Figure 6:
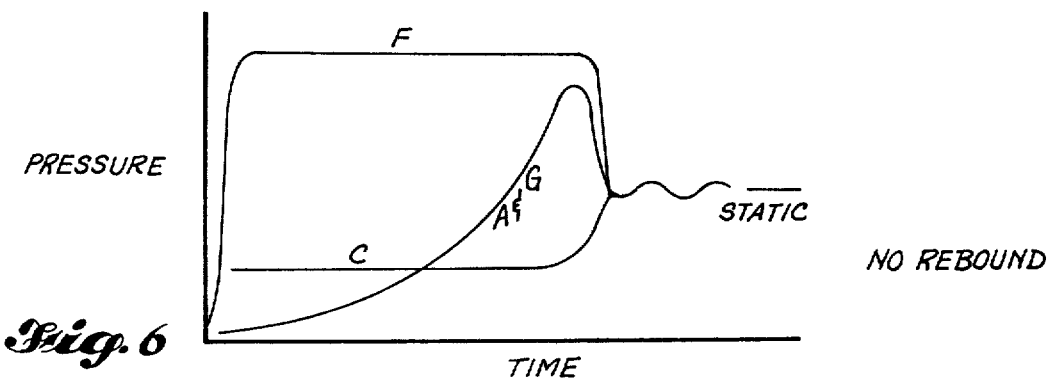
FIG. 6 is a graph showing pressure variations as a function time in various chambers of the strut when there is no rebound.

Operation of the strut during a compression stroke is illustrated in FIG. 2. As inner cylinder 11 moves into outer cylinder 10, fluid from Chamber F is forced between metering pin 29 and orifice lip 21, and valve ring 19 closes off ports 18. After passing through the restriction formed by pin 29 and lip 21, the fluid flows upward inside tube 16 and into Chamber A through ports 22, compressing the gas in Chamber A. As Chamber G enlarges in volume valve ring 25 is forced away from the ports 24 and against flange 20 permitting fluid from Chamber A to enter Chamber G. Because of the restricted flow between metering pin 29 and lip 21, the pressure in Chamber F rises rapidly as the strut is compressed. As shown in FIG. 6, the pressure in Chambers A and G increases according to the physical laws of gas springs. The pressure in Chamber F is transmitted to Chamber E through taxi ports 36 and gradually to Chamber D through taxi bleed ports 35. The pressures in Chambers F and E remain nearly equal because of the relatively unrestricted flow between them.

During a compression stroke the pressure in Chamber E acting on boss 31 tends to force the free-floating piston 32 downward against the force of the high pressure gas in Chamber C. Even though the pressure in Chamber E may exceed that in Chamber C, the area of boss 31 is enough smaller than that of piston 32 so that the upward gas force exceeds the downward fluid force and piston 32 remains essentially in place. Accordingly, Chamber C, the second-stage of the gas spring, remains inactive during the compression stroke.

At this point, the pressure in Chamber C remains at the precharged pressure and the pressure in Chamber D is gradually increasing as liquid is metered into it through taxi bleed ports 35. When the downward force on piston 32 exceeds the upward force, it begins to move downward, compressing the gas in Chamber C. When boss 31 disengages bleed port cylinder 30, fluid flows with relative freedom from Chamber F to Chamber D. As piston 32 compresses the gas in Chamber C, increasing its pressure, the pressure in Chamber F correspondingly decreases to a value lower than that in Chambers A, B and G and valve ring 19 uncovers ports 18, so that intercommunication between chambers tends to equalize the pressures.

This condition, illustrated in FIG. 4, prevails during taxiing, so that the combined gas volumes provide a soft spring for the suspension function. Some of the flow between Chambers A and B, and B and G is through ports 22, since upper piston assembly 23 is in such a position that the lower set of ports 22 opens into Chamber G. The gas pressures in Chamber C and A are essentially equal during taxi. As loads on the strut vary because of the unevenness in the taxiway surface, inner cylinder 11 will telescope into and out of outer cylinder 10, causing compression and expansion of the gas volumes and fluid will flow in alternating directions, primarily through orifices 18, ports 22 and taxi ports 36. This flow provides damping for the suspension function.

Figure 7:
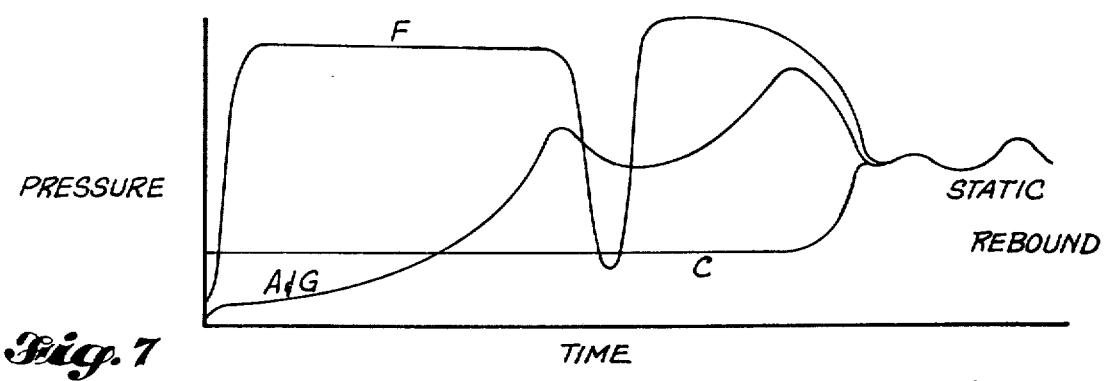
FIG. 7 shows the same when a rebound occurs.

The operation as described thus far is based on a smooth transition from flying to ground roll during the landing such as occurs when the lift of the wings becomes essentially zero during the time interval between the first contact of the wheels with the ground and the completion of the compression of the shock strut. In the event the loss of lift is not completed during the interval, the energy stored in the gas in Chamber A tends to force an extension or rebound of the strut. FIG. 3 illustrates the function of this strut during a rebound stroke. As the strut extends, inner cylinder 11 moves downward with respect to outer cylinder 10. As it does, volume G located between the upper and lower piston assemblies 23 and 18 decreases and the fluid therein is forced to flow through ports 18 into Chamber F. The increased pressure in Chamber G causes valve ring 25 to move upward, sealing off ports 24. The pressure drop across ports 18 assures that the pressure in Chamber F will be low, so that the second stage will not begin to function prematurely and so the strut is set properly for a second compression stroke at the end of the rebound. Typical pressure variations within the various chambers of the strut during a compression and a compression-rebound cycle are shown schematically in FIG. 7.

Figure 8:
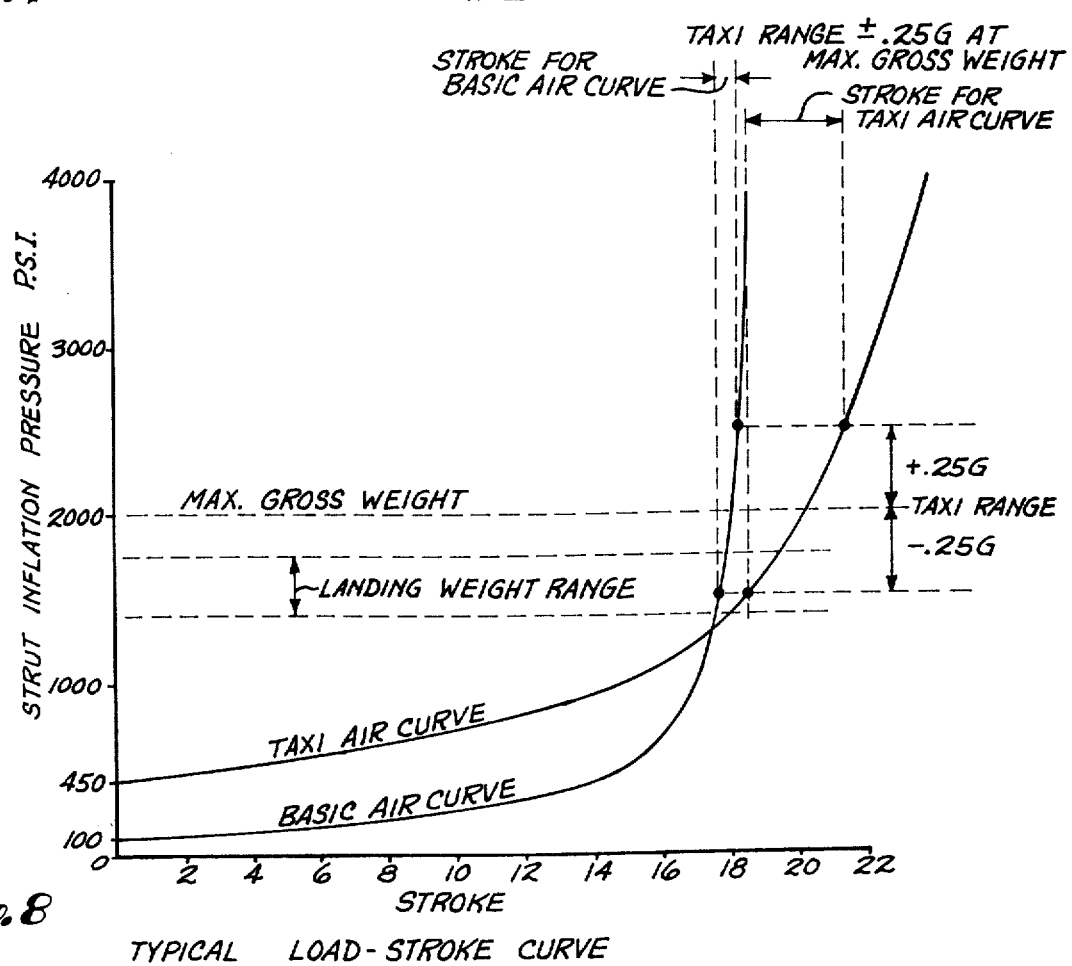
FIG. 8 is a typical load stroke diagram for the strut.

FIG. 8 is a typical load-stroke diagram for the strut. The basic air curve represents the characteristics which the strut would exhibit if it incorporated only a single air chamber such as Chamber A. A strut of this sort would permit only a relatively short stroke for an aircraft taxiing of maximum gross weight and experiencing a 0.25g oscillation. However, the strut disclosed operates along the basic air curve at pressures below point "x" and along the taxi air curve at greater pressures. Accordingly, a much greater stroke and, therefore, a smoother ride, is achieved for the same 0.25 g oscillation.

The shock absorption is relatively efficient since, with only one air chamber functioning during shock absorption, a relatively large part of the energy is converted into heating the fluid and a relatively small part stored in the spring. The volume occupied by the second stage, Chamber C, is usually empty in a conventional strut. The strut extension during rebound is controlled effectively and with moderate hydraulic pressure because the working area is that of upper piston 23 and not the same as the area of the lower edge of rim 12 as in conventional struts. The operation of both gas volumes during taxiing provides a soft ride with ample telescopic deflection to produce hydraulic damping as fluid is pumped through the various ports.

As can be recognized by those familiar with the art to which the subject invention relates, the subject device, according to the invention, achieves the aforementioned objectives. While one preferred form of this invention has been described, other and obvious modifications and variations are possible in light of the disclosures made herein. Therefore, this invention should be considered to be limited only by the scope of the appended claims.

What is claimed is:

1. A shock absorbing strut comprising: an outer and an inner cylinder, each having a closed end and open end, the cylinders being telescopically engaged at their open ends; a first piston assembly fitting internally in said inner cylinder, closely fitting the interior wall of said inner cylinder, and supported by means of a tube member from the closed end of said outer cylinder; and a second piston assembly attached to the inner wall of said inner cylinder and closely fitting the exterior wall of said tube member; wherein said strut is internally divided into three annular volumes; the first annular volume being bounded by the inner walls of the inner and outer cylinders, the outer wall of the tube member, the closed end of the outer cylinder and the first piston; the second annular volume being bounded by the inner wall of the inner cylinder, the outer wall of the tube member, and the first and second pistons; and the third annular volume including as boundaries the inner wall of the inner cylinder, the outer wall of the tube member, the second piston and the closed end of the inner cylinder; a plurality of orifice means such that a portion of hydraulic fluid is forced through said orifice means during a compressive motion of said strut, thus dissipating energy through viscous friction; means for storing a portion of said energy by compression of a first volume of gas, said gas tending to expand said strut; means for dissipating a portion of said stored energy through viscous friction during expansion of said strut; means for storing addition energy by compression of a second volume of gas having a pre-determined initial volume; and means for reducing the viscous frictional forces opposing compression and expansion of said strut which means begin to function when said second volume of gas is compressed to a volume smaller than its said predetermined initial volume.

2. The shock absorbing strut of claim 1 wherein said plurality of orifice means comprises: a plurality of orifices in the walls of said tube member permitting communication between the volumes located inside and outside of said tube member; and an orifice and check valve assembly in said first piston permitting restricted flow of hydraulic fluid in the direction of the open end of said outer cylinder but preventing significant flow in the opposite direction.

3. The shock absorbing strut of claim 1 wherein said plurality of orifice means comprises an orifice at the end of said tube member opposite the closed end of said outer cylinder cooperating with a metering pin mounted to the closed end of said inner cylinder so as to form a restricted passage between said metering pin and said orifice through which hydraulic fluid may pass.

4. The shock absorbing strut of claim 1 wherein said means for storing a portion of said energy comprises a volume of gas contained with the said first annular volume, said volume of gas being compressible by a compression of said strut but resiliently opposing compression of said strut.

5. The shock absorbing strut of claim 1 wherein the said means for dissipating a portion of said stored energy during expansion of said strut comprises means for containing a hydraulic fluid; a plurality of orifice means and a check valve assembly which permits restricted flow of hydraulic fluid in one direction during an expansion of said strut but prevents flow in the opposite direction, such that upon an expansion of said strut a portion of said hydraulic fluid is forced through said orifice thus dissipating energy through viscous friction.

6. The shock absorbing strut of claim 1 wherein said means for dissipating energy during expansion of said strut comprises an orifice in said second piston providing communication between said second and third annular volumes and a check valve assembly permitting restricted flow of hydraulic fluid through said orifice from said second annular volume into said third annular volume but preventing significant flow in the opposite direction.

7. The shock absorbing strut of claim 1 wherein said means for storing additional energy comprises a closed cylindrical chamber containing a free-floating piston, hydraulic fluid and a volume of gas, and having a port means in one end providing communication between said cylindrical chamber and said third annular volume such that an increase in pressure of hydraulic fluid within said third annular volume is transmitted to a portion of one side of said free-floating piston urging it to compress said volume of gas.

8. The shock absorbing strut of claim 1 wherein said means for reducing viscous frictional forces comprises a fluid-filled hollow cylindrical projection extending into said cylindrical chamber from one end thereof, a boss centrally located on the face of said free-floating piston such that it can seal the open end of said cylindrical projection, a plurality of taxi ports providing communication between the volume within said cylindrical projection and said third annular volume, and a plurality of taxi bleed ports through the walls of said cylindrical projection such that when said boss is seated and the strut is being compressed, the buildup of hydraulic force on said free-floating piston is delayed by the restrictive effect of said taxi bleed ports, but when the force is sufficient to unseat it, pressure and fluid may pass through the taxi ports directly into said cylindrical chamber.

* * * * *